US009796125B2

(12) United States Patent
Rymann

(10) Patent No.: US 9,796,125 B2
(45) Date of Patent: Oct. 24, 2017

(54) BLOWING CYLINDER

(71) Applicant: Norgren AG, Balterswil (CH)

(72) Inventor: Othmar Rymann, Balterswil (CH)

(73) Assignee: Norgren AG, Balterswil (CH)

( * ) Notice: Subject to any disclaimer, the term of this patent is extended or adjusted under 35 U.S.C. 154(b) by 0 days.

(21) Appl. No.: 15/109,002

(22) PCT Filed: Dec. 31, 2014

(86) PCT No.: PCT/EP2014/079503
§ 371 (c)(1),
(2) Date: Jun. 29, 2016

(87) PCT Pub. No.: WO2015/104212
PCT Pub. Date: Jul. 16, 2015

(65) Prior Publication Data
US 2016/0325484 A1    Nov. 10, 2016

Related U.S. Application Data

(60) Provisional application No. 61/924,303, filed on Jan. 7, 2014.

(51) Int. Cl.
*B29C 49/58*    (2006.01)
*F15B 15/22*    (2006.01)
*B29C 49/12*    (2006.01)
*B29C 49/78*    (2006.01)
*B29C 49/06*    (2006.01)
*B29L 31/00*    (2006.01)

(52) U.S. Cl.
CPC .............. *B29C 49/58* (2013.01); *B29C 49/12* (2013.01); *B29C 49/78* (2013.01); *F15B 15/227* (2013.01); *B29C 49/06* (2013.01); *B29C 2049/5865* (2013.01); *B29C 2049/5868* (2013.01); *B29L 2031/7158* (2013.01)

(58) Field of Classification Search
CPC ............ B29C 49/58; B29C 2049/5803; B29C 2049/5841; B29C 2049/5865; B29C 2049/5868; F15B 15/227
See application file for complete search history.

(56) References Cited

U.S. PATENT DOCUMENTS 3,466,702 A * 9/1969 Stenger .................. B29C 49/48
                                                    264/533
6,464,486 B1    10/2002 Barray et al.
2008/0286402 A1    11/2008 Mie

FOREIGN PATENT DOCUMENTS

EP    2054214 A2    5/2009
FR    2267874 A1 * 11/1975 ............. B29C 49/18

* cited by examiner

Primary Examiner — Robert B Davis
(74) Attorney, Agent, or Firm — The Ollila Law Group LLC

(57) ABSTRACT

A blow cylinder and a method for actuating the same are provided. The blow cylinder includes a blow piston and a brake piston, wherein the brake piston is controlled independently of the actuation of the blow piston towards the extended position.

23 Claims, 7 Drawing Sheets

BLOWING CYLINDER

TECHNICAL FIELD

The present Application relates to cylinders, and more particularly, to cylinders for blow-molding.

BACKGROUND OF THE APPLICATION

Blow-molding is a process for molding a preform part into a desired product. The preform is in the general shape of a tube with an opening at one end for the introduction of pressurized gas, typically air; however, other gases may be used. One specific type of blow-molding is stretch blow-molding (SBM). SBM can be used in a wide variety of applications; however, one of the most widely used applications is in the production of Polyethylene terephthalate (PET) products, such as drinking bottles.

SBM is typically performed with an SBM machine. FIG. 1 depicts an example SBM machine As may be seen from FIG. 1, example SBM machine 100 includes a blow valve block 102, a blow cylinder 104, and a blow mold 106. Blow valve block 102 provides low-pressure and high-pressure fluid supplies to blow cylinder 104, and may also be used to reclaim gas, or to exhaust gas.

The blow cylinder moves reciprocally between a retracted and extended position to come into contact with a preform 108 positioned below. The travel of the portion of the blow cylinder that makes contact with preform 108, preform 108 being positioned in blow mold 106, indicated by two-headed arrow 112, is typically on the scale of 25-35 mm. In the retracted position, blow cylinder 106 is positioned to allow a gripper (not shown) to insert preform 108 into blow mold 106 or remove a finished product from blow mold 106.

In FIG. 1, blow cylinder 104 is represented in an extended position, providing a fluid connection between blow valve block 102 and a preform 108. In the extended position, blow cylinder 104 seats on a portion of preform 108 external to blow mold 106 to create a seal. In FIG. 1, a stretch rod 110 is extended into preform 108. Stretch rod 110 may be used to longitudinally expand preform 108 into mold cavity 106. A portion of preform 108 is positioned internal to blow mold 106, and a portion of preform 108 remains external to blow mold 106. Blow mold 106 includes a cavity that comprises the outer shape of the desired product.

Typically, the SBM process uses a low-pressure fluid supply from blow valve block 102 along with stretch rod 110 during a pre-blow phase to stretch the preform 108 in a longitudinal direction and radially outward. The SBM process next uses a high-pressure fluid supply during a blowing phase to expand the portion of preform 108 into blow mold 106. The resulting product is generally hollow with an exterior shape conforming to the shape of mold cavity 106. The gas in the preform 108 is exhausted through blow valve block 102. This process is repeated during each blow-molding cycle.

Blow cylinder 104 provides a fluid connection between the blow valve block 102 and preform 108 in blow mold 106. The SBM machine 100 only applies pressurized gas to the preform 108 when blow cylinder 104 in an extended position. Blow cylinder 108 travel time can therefore add considerably to the overall SBM cycle time to fabricate a bottle or product. It is important to extend and retract blow cylinder 104 as quickly as possible, in instances cycle times between 40-60 ms are desirables. Simply increasing the acceleration of blow cylinder 104 can damage the SBM machine components, however. Blow cylinder 104, preform 108, blow mold 106, and any seals therein may be damaged if forcefully impacted. It is therefore important that blow cylinder 104 and/or any seal make gentle contact with preform 108 and/or blow mold 106.

Prior blow cylinders designs rely on hydraulic braking, industrial shocks, and spring or rubber buffers for damping. These prior damping technologies feature braking distances that can encompass a relatively large percentage of the typical 25-35 mm blow cylinder travel distance. When a large percentage of travel distance is required to brake a blow cylinder, the SBM cycle time is slower.

Existing blow cylinders are complicated, include many component parts, and have relatively large moving masses in the range of 800-2500 g. The larger moving masses require additional force and damping in an SBM process cycle.

The SBM process may further include hot fill process. In a hot fill process a PET bottle is blown in a heated blow mold 106. The heated mold may increase the degree of crystallization of the resulting bottle to produce, among other qualities, a heat-resistant bottle which can be used with hot beverages. The hot fill process often accompanies the pre-blow portion of the SBM process. Heat from the blow mold has the potential to damage the seals positioned between the blow cylinder 100 and blow mold 106 or preform 108 adjacent to blow mold 106, however. Therefore, blow cylinder 106 must make contact with a portion of preform 108 that is not immediately adjacent to blow mold 106 during a hot fill process. After the SBM process is performed on the blow mold 106-heated preform, cool air may be blown into the finished bottle through fine holes in stretch rod 110.

The SBM process may further include a cold set process. In a cold set process, a preform may be heated in an oven before being placed in the blow mold 106. Without the danger of damaging seals from a heated blow mold 106, as is the case during the hot fill process, it is possible to seat blow cylinder 100 on a portion of preform 108 adjacent to blow mold 106 or on blow mold 106 itself. After the SBM process has been performed on the oven-heated preform, blow mold 106 may be cooled provide a finished bottle.

Traditionally, SBM machines have included a separate blow cylinder for each of the hot fill and cold set operations. However, the practice of using two blow cylinders adds extra complication, expense, and process time to the SBM process.

There is a need in the art for a blow cylinder that is inexpensive and easy to operate, and capable of supporting fast SBM cycle times. There is a need for a blow cylinder that is simple, light weight, and able to actuate quickly with a relatively short braking distance. The braking must includes adequate damping to avoid damaging SBM machine components, performs, and end products, however. The present embodiments described below overcome these and other problems and an advance in the art is achieved.

SUMMARY OF THE APPLICATION

A blow cylinder is provided according to an embodiment. The blow cylinder includes a blow piston and a brake piston. The brake piston is controlled independently of the actuation of the blow piston towards the extended position.

A method for actuating a blow cylinder to an extended position is provided. The method includes the step of actuating a blow piston towards the extended position. The method further includes the step of braking the blow piston using the brake piston. The brake piston is controlled independently of the actuation of the blow piston towards the extended position.

Aspects

In one embodiment of the blow cylinder, the blow piston is configured to actuate via an upper control chamber and a lower control chamber, and the brake piston is configured to actuate via a brake control chamber.

In one embodiment of the blow cylinder, the brake control chamber includes adjustable braking.

In one embodiment of the blow cylinder, the adjustable braking is controlled via an adjustable throttle.

In one embodiment of the blow cylinder, the brake control chamber is pressurized independently of the upper control chamber and the lower control chamber.

In one embodiment of the blow cylinder, a first valve in fluid communication with the upper control chamber and the lower control chamber, the first valve configured to actuate the blow piston.

In one embodiment of the blow cylinder, the first valve is further in fluid communication with the brake control chamber, the first valve configured to actuate the brake piston.

In one embodiment of the blow cylinder, an adjustable nozzle is coupled to the blow cylinder.

In one embodiment of the blow cylinder, the blow cylinder further includes a seal and a nozzle, wherein the seal is seated between the nozzle and a top of a preform when the nozzle is in the extended position.

In one embodiment of the blow cylinder, the blow cylinder further includes a seal and a nozzle, wherein the seal is seated between the nozzle and a neck portion of a preform when the nozzle is in the extended position.

In one embodiment of the blow cylinder, claim 1, further comprising at least one damping ring (272) positioned on the brake piston (206) to dampen the movement of the brake piston (206) upon impact with the blow piston (204).

In one embodiment of the method, the blow piston is configured to actuate via an upper control chamber and a lower control chamber, and the brake piston is configured to actuate via a brake control chamber.

In one embodiment of the method, the brake control chamber includes adjustable braking.

In one embodiment of the method, the adjustable braking is controlled via an adjustable throttle.

In one embodiment of the method, the brake control chamber is pressurized independently of the upper control chamber and the lower control chamber.

In one embodiment of the method, the blow cylinder further includes a first valve in fluid communication with the upper control chamber and the lower control chamber, the first valve configured to actuate the blow piston.

In one embodiment of the method, the first valve is further in fluid communication with the brake control chamber, the first valve configured to actuate the brake piston.

In one embodiment of the method, the blow cylinder further includes an adjustable nozzle coupled to the blow cylinder.

In one embodiment of the method, the blow cylinder further includes a seal and a nozzle, wherein the seal is seated between the nozzle and a top of a preform when the nozzle is in the extended position.

In one embodiment of the method, the blow cylinder further includes a seal and a nozzle, wherein the seal is seated between the nozzle and a neck portion of a preform when the nozzle is in the extended position.

In one embodiment of the method, the blow cylinder further includes at least one damping ring positioned on the brake piston to dampen the movement of the brake piston upon impact with the blow piston.

In one embodiment of the method, the method further includes the step of actuating the brake piston to initiate actuation of the blow cylinder away from the extended position.

DETAILED DESCRIPTION OF THE APPLICATION

FIG. 2-7 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
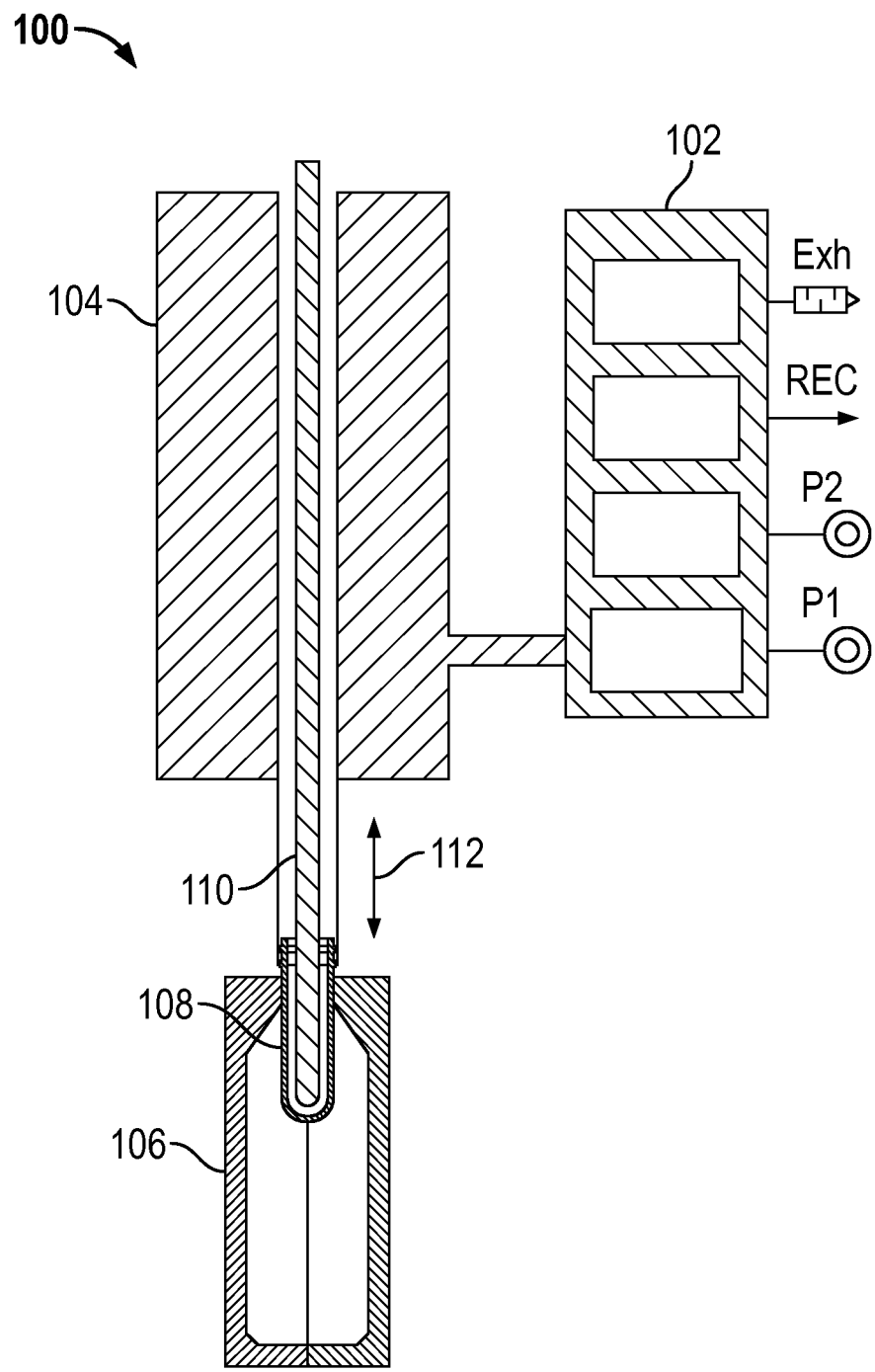
FIG. 1 depicts a system view of stretch blow molding (SBM) machine 100.
Figure 2:
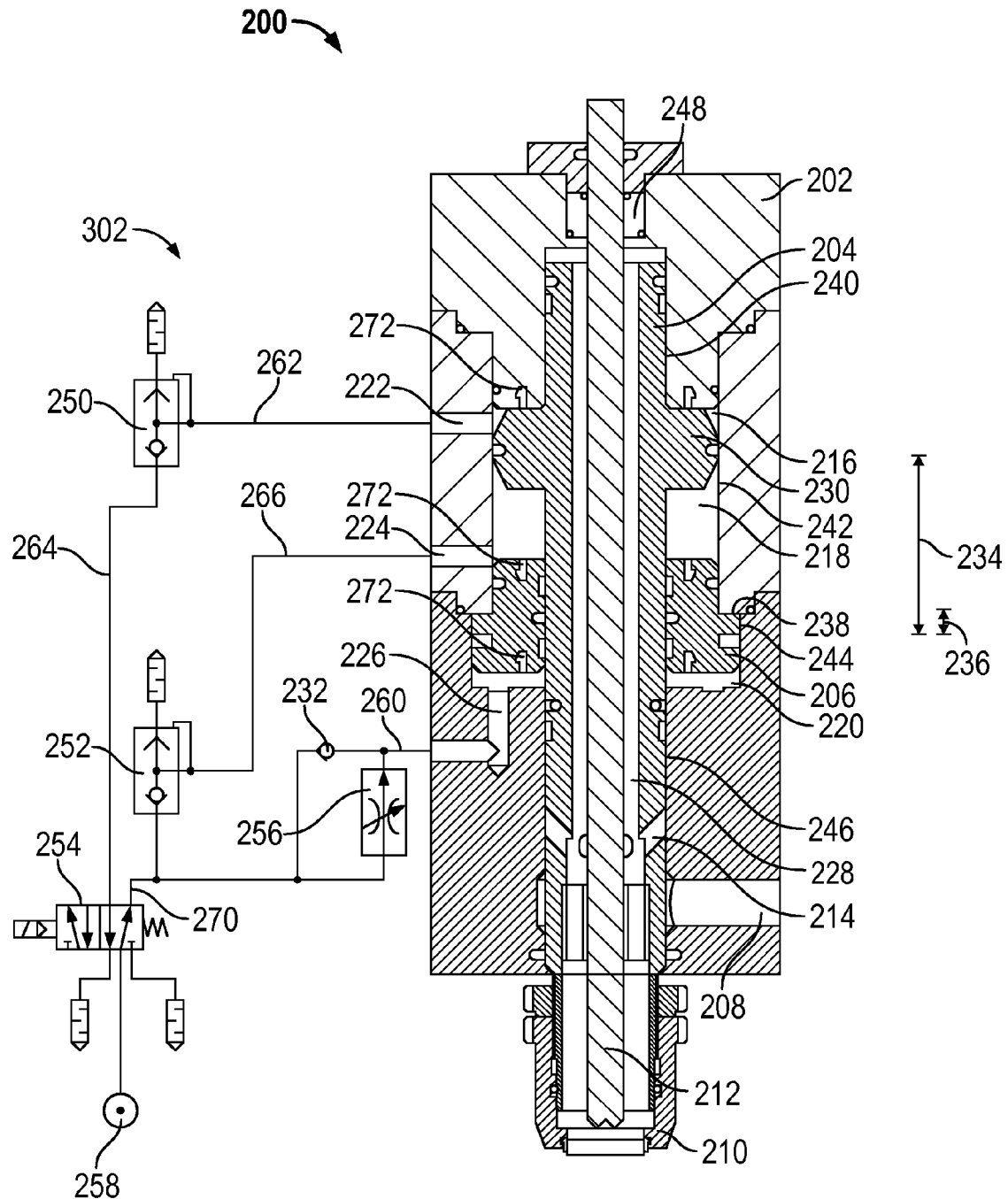
FIG. 2 depicts blow cylinder 200 and pneumatic circuit 302, in accordance with an embodiment.

FIG. 2 depicts a detail of blow cylinder 200 in accordance with an embodiment. In FIG. 2, blow cylinder 200 is depicted in a retracted position. Blow cylinder 200 may extend to provide a mechanical and fluid connection between blow valve block 102 and preform 108. When blow cylinder 200 is in contact with preform 108, pressurized fluid may pass into preform 108 from blow valve block 102, or fluid may exhaust from preform 108 to blow valve block 102. Blow cylinder 200 is also able to retract to enable a gripper (not shown) to insert and remove preform 108 from blow mold 106. Blow cylinder 200 includes cylinder body 202, blow piston 204, brake piston 206, cylinder port 208, nozzle 210, and stretch rod 212. Cylinder body 202 encompasses at least a portion of blow piston 204, brake piston 206, and stretch rod 212.

Cylinder body 202 protects the components of blow cylinder 200, defines essential fluid passageways, and keeps the components of blow cylinder 200 in alignment. Cylinder body 202 is a body that houses at least a portion of the blow piston 204, brake piston 206, and stretch rod 212. Cylinder body 202 also includes fluid ports, such as ports 208, 222, 224, and 226. In the embodiment of FIG. 2, cylinder body includes one or more central cavities to accommodate the blow piston 104, brake piston 106, and stretch rod 212. The one or more central cavities of cylinder body 202 may include: stretch rod fixture bore 248, upper blow piston bore 240, blow piston control bore 242, brake control bore 244, and lower blow piston bore 246. In embodiments, stretch rod fixture bore 248, upper blow piston bore 240, blow piston control bore 242, brake control bore 244, and lower blow piston bore 246 may be concentric cylinders. Upper and lower blow piston bores 240 and 246 may be formed with the same diameter. Blow piston control bore 242 may be formed with a larger diameter between upper and lower blow piston bores 240 and 246. Brake control bore 244 may be formed with a larger diameter than blow piston control bore 242 between blow piston control bore 242 and lower blow piston control bore 246.

Blow cylinder 200 includes blow piston 204. Blow piston 204 is operable to reciprocate between an extended position and a retracted position. Blow piston 204 may be actuated via any means known to those of skill in the art, including via pneumatic control or via a cam system. Blow piston 204 is at least partially encased inside blow cylinder 200, within upper blow piston bore 240, blow piston control bore 242, brake control bore 206, and lower blow piston bore 246. Blow piston 204 includes a central longitudinal body with a hollow central portion 228. Fluid may flow between blow valve block 102 and preform 108 through central portion 228 when blow piston 204 is actuated towards the extended position, aligning blow piston port 214 and cylinder port 208. One end of the longitudinal body that forms blow piston 204 is coupled to a nozzle 210 positioned outside the cylinder body 202. The end of the longitudinal body that forms blow piston 204 opposite nozzle 210 comes to rest inside upper blow piston bore 240.

Blow piston 204 includes an annular portion 230 extending from the longitudinal body. The annular portion 230 is encased inside upper blow piston bore 240. Annular portion 230, when moved within the cylinder body 202, may come to rest against the top of upper blow piston bore 240 in a retracted position or against brake piston 206 in an extended position, defining a blow stroke 234, as indicated by a double-side arrow in FIG. 2. Upper control chamber 216 is defined by the three dimensional space above annular portion 230 inside upper blow piston bore 240. Because blow cylinder 200 is retracted in FIG. 2, upper control chamber 216 is relatively small. Lower control chamber 218 is defined by the three dimensional space found between annular portion 230 and the brake piston 206. An upper port 222 allows fluid to enter and exit upper control chamber 216, and a lower port 224 allows fluid to enter and exit lower control chamber 218. By applying pressure to upper control chamber 216 or lower control chamber 218, it is possible to actuate blow piston 204.

Blow cylinder 200 further includes brake piston 206. Brake piston 206 is formed as an annular disk concentrically surrounding blow piston 204. Brake piston 206 is movable within the interior of cylinder body 202 between a retracted position and an extended position to define a brake stroke 236, as indicated by a double-sided arrow in FIG. 2. A brake control chamber 220 is defined by the three dimensional space below the brake piston 206 in brake control bore 244.

In embodiments, brake piston 206 may have a stepped exterior shape formed with different diameters. The stepped exterior of the brake piston 206 may be retained by lip 238 between blow piston control bore 242 and brake control bore 244 when brake piston 206 is a retracted position. Brake piston 206 may come to rest against the bottom of brake control bore in an extended position. When blow piston 204 actuates to make contact with brake piston 206, both blow piston 204 and brake piston 206 may actuate together over an overlapped blow stroke 234 and brake stroke 236 region.

In embodiments, brake piston 206 may include one or more damping rings 272. Damping rings 272 may be coupled on the upper or lower impact surfaces of brake piston 206 to provide a further level of damping when blow piston 204 impacts brake piston 206 or brake piston 206 impacts the bottom of brake control bore 244. In embodiments, cylinder body 202 may also include one or more damping rings 272. For example, a damping ring 272 may be positioned at the top of blow piston control bore 242, configured to dampen the impact of blow piston 204 when blow piston 204 actuates to the retracted position.

Blow cylinder 200 further includes stretch rod 212. Stretch rod 212 may be coupled inside blow cylinder 200 by a fixture positioned inside stretch rod fixture bore 248. Stretch rod 212 is positioned within blow piston central portion 228, movable to extend and retract from the nozzle 210 end of blow piston 204. Stretch rod 212 may be used to longitudinally stretch a preform during the SBM process. In embodiments, stretch rod 212 may further include an internal conduit (not pictured in FIG. 2) through which fluid may pass into or out of a preform. For example, in embodiments stretch rod 212 may be used to pass cold fluid into a preform during a cold set process. Stretch rod 212 may be coupled and aligned with blow cylinder 200 using any method commonly known to those of skill in the art. In embodiments, stretch rod 212 extends outside blow cylinder 200.

Blow cylinder 200 may include nozzle 210. Nozzle 210 is configured to control the direction and flow of fluid between preform 108 and blow cylinder 200. In embodiments, nozzle 210 may include one or more static seals designed to create an airtight seal between nozzle 210 and preform 108. In other embodiments, nozzle 210 may seat upon one or more seals coupled to on preform 108.

In embodiments, blow cylinder 200 may be operated via a pneumatic circuit 302. For example, FIG. 2 depicts valves 250, 252, 254, 256, pressurized fluid source 258, and fluid lines 260, 262, 264, 266, and 270. In embodiments, pressurized fluid source 258 may provide fluid pressurized between 6-10 bar to operate blow cylinder 200.

In pneumatic circuit 302, upper port 222 is in communication with valve 250 via fluid line 262. In embodiments, valve 250 may be a quick-exhaust valve, operable to allow pressurized fluid from fluid line 264 to pass into fluid line 262 and onto upper control chamber 216. Quick-exhaust valve 250 also allows fluid to exhaust from fluid line 262, thereby venting upper control chamber 216.

In pneumatic circuit 302, lower port 224 is in communication with valve 252 via fluid line 266. In embodiments, valve 252 may also be a quick-exhaust valve, operable to allow fluid from fluid line 270 to pass into fluid line 266 and on to lower control chamber 218. Quick-exhaust valve 252 may further allow fluid to exhaust from fluid line 266, thereby venting lower control chamber 218.

By pressurizing or exhausting upper and lower control chambers 216 and 218, valves 250 and 252 may actuate blow piston 204 through a first portion of blow stroke 234 that does not overlap brake stroke 236.

In pneumatic circuit 302, brake port 226 is in communication with valve 256 via fluid line 260. Valve 256 may further be in communication with fluid line 270, and therefore valve 254. In embodiments, valve 256 may be a throttle. For example, valve 256 may be an adjustable throttle connected in parallel with a check valve 232. Valve 256 and check valve 232 may allow fluid to flow into brake control chamber 220 largely unrestricted, but divert fluid flowing out of brake control chamber 220 through a throttle.

Valve 254 may allow fluid to pass from pressurized fluid source 258 into brake control chamber 220 via check valve 232, actuating valve piston 206. Valve 254 may also allow fluid to exhaust through adjustable throttle 256, thereby controlling the movement of brake piston 206 through brake stroke 236.

In pneumatic circuit 302, valve 254 may control the actuation of blow cylinder 200. Valve 254 may be in communication with valve 250 via fluid line 264, in communication with valve 252 via fluid line 270, and in communication with valve 256 via line 270. In embodiments, valve 254 may be a pilot-operated a 2-way 5-port valve spring-biased in a first position, the first position (depicted in FIG. 2) actuating blow cylinder 200 to a retracted position. In the first position, valve 254 may provide pressurized fluid to both lower control chamber 218 and brake control chamber 220 while exhausting upper control chamber 216 via line 264.

Valve 254 may be actuated to a second position. In the second position, valve 254 may provide pressurized fluid to upper control chamber 216 via fluid line 264. In the second position, valve 254 may further allow fluid to exhaust from lower control chamber 218 and brake control chamber 220 via fluid line 270. In embodiments, valve 254 may be actuated via a pilot valve. In other embodiments, valve 254 may be actuated via a solenoid, or any other mechanism known to those of skill in the art.

Figure 3:
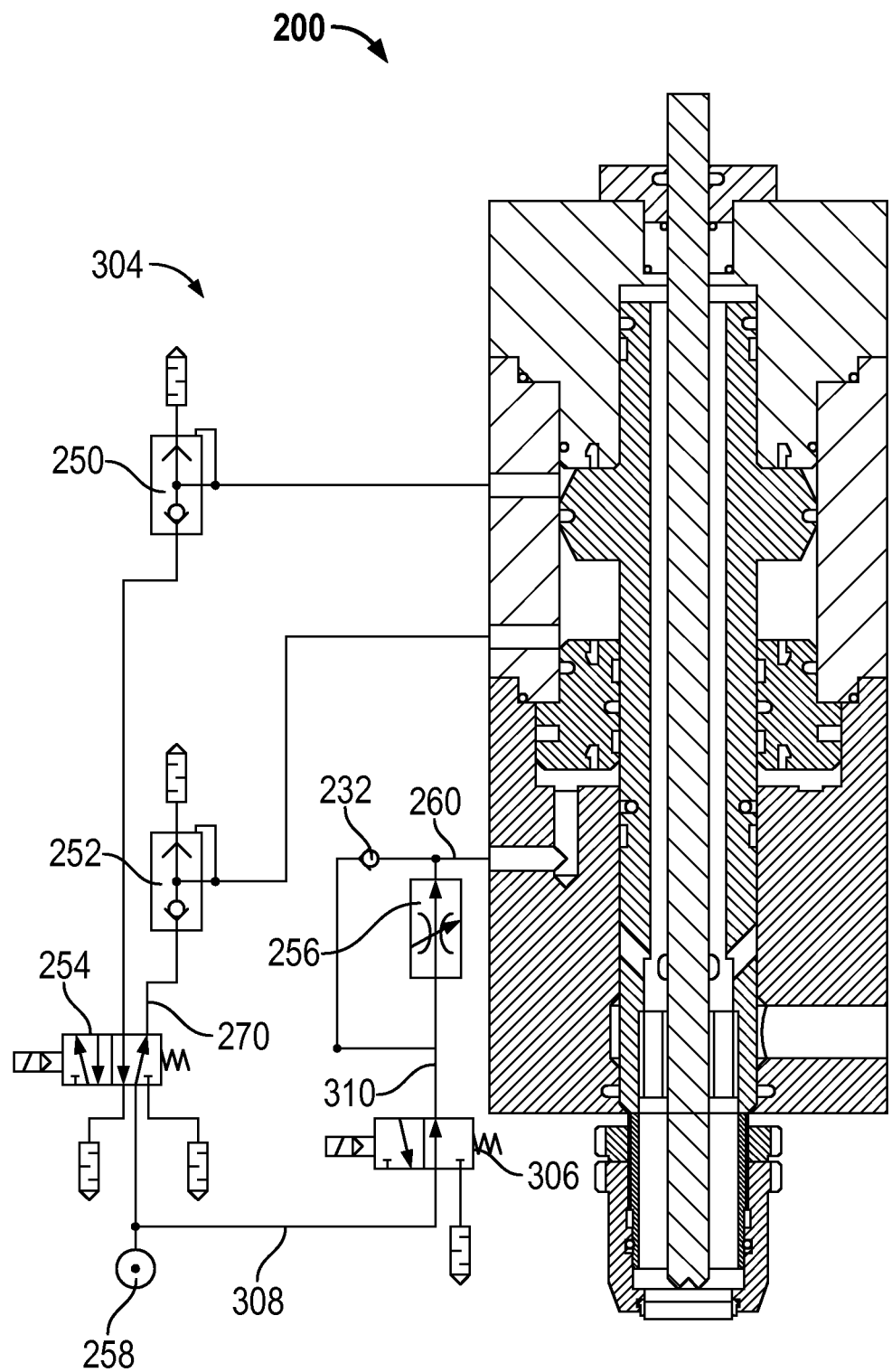
FIG. 3 depicts blow cylinder 200 and pneumatic circuit 304, in accordance with an embodiment.

FIG. 3 depicts pneumatic circuit 304, in accordance with an embodiment. Pneumatic circuit 304 is similar to pneumatic circuit 302, but that pneumatic circuit 304 includes additional valve 306. Valve 306 may be in communication with valve 256 via fluid line 310, and in communication with pressurized fluid source 258 via fluid line 308. In embodiments, valve 306 may be a pilot-operated a 2-way 3-port valve spring-biased in a first position, the first position actuating brake piston 206 to a retracted position. In the first position (depicted in FIG. 3), valve 306 may provide pressurized fluid to brake control chamber 220 via fluid line 260.

Valve 306 may also be actuated to a second position. In the second position, valve 306 may allow fluid in fluid line 310 from brake control chamber 220 to exhaust. In embodiments, valve 306 may be actuated via a pilot valve. In other embodiments, valve 254 may be actuated via a solenoid, or any other mechanism known to those of skill in the art.

Pneumatic circuit 304 differs from pneumatic circuit 302 further in that fluid line 270 is not connected to valve 256. Advantageously, pneumatic circuit 304 allows brake piston 206 to actuate and/or pressurize independently of blow piston 204. In embodiments, valve 306 may be used to accelerate the retraction of blow cylinder 200 by actuating brake piston 206 into a retracted position before actuating blow piston 204 into a retracted position. In further embodiments, valve 306 may be used to select the amount of damping of blow cylinder 200 provided via brake piston 206.

Figure 4:
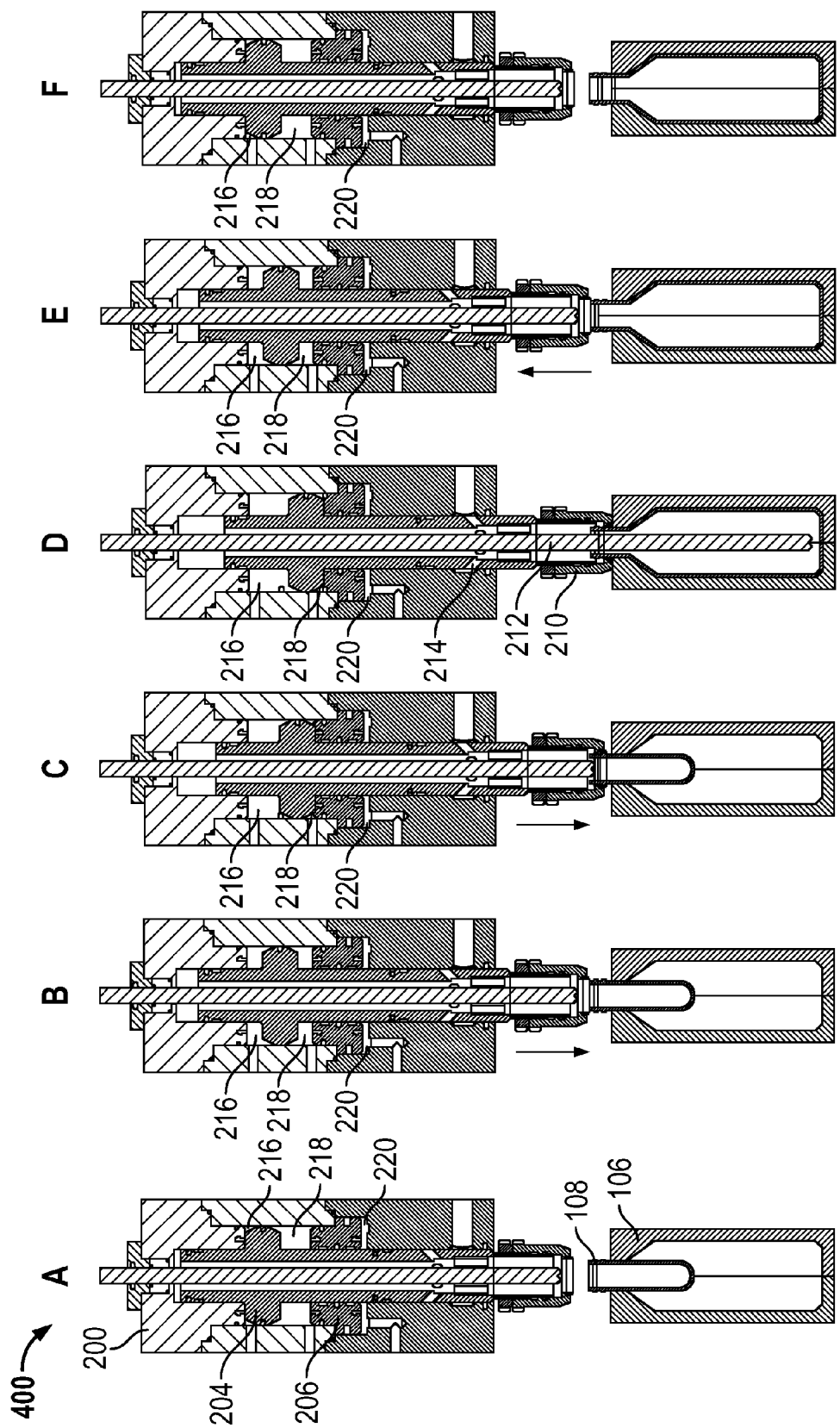
FIG. 4 depicts process 400, in accordance with an embodiment.

FIG. 4 depicts a process 400. In process 400, the positions of blow cylinder 200, blow mold 106, preform 108, and stretch rod 212 may be viewed throughout the SBM cycle. Process 400 begins with phase A. In phase A, blow cylinder 200 is in a retracted position. In the retracted position, the fluid in upper control chamber 216 has been exhausted and blow piston 204 is resting against the top of blow piston control bore 242. In embodiments, brake control chamber 220 may be pressurized so that brake piston 206 rests upon the top of lower control chamber 218. For example, in the example of pneumatic circuit 302, valve 254 may provide pressurized fluid to lower control chamber 218 and brake control chamber 220. In the example of pneumatic circuit 304, however, valve 254 may provide pressurized fluid to lower control chamber 218 and valve 306 may provide pressurized fluid to brake control chamber 220. In phase A, blow cylinder 200 is in a position for grippers to remove an end product bottle, or insert a new preform.

Figure 5:
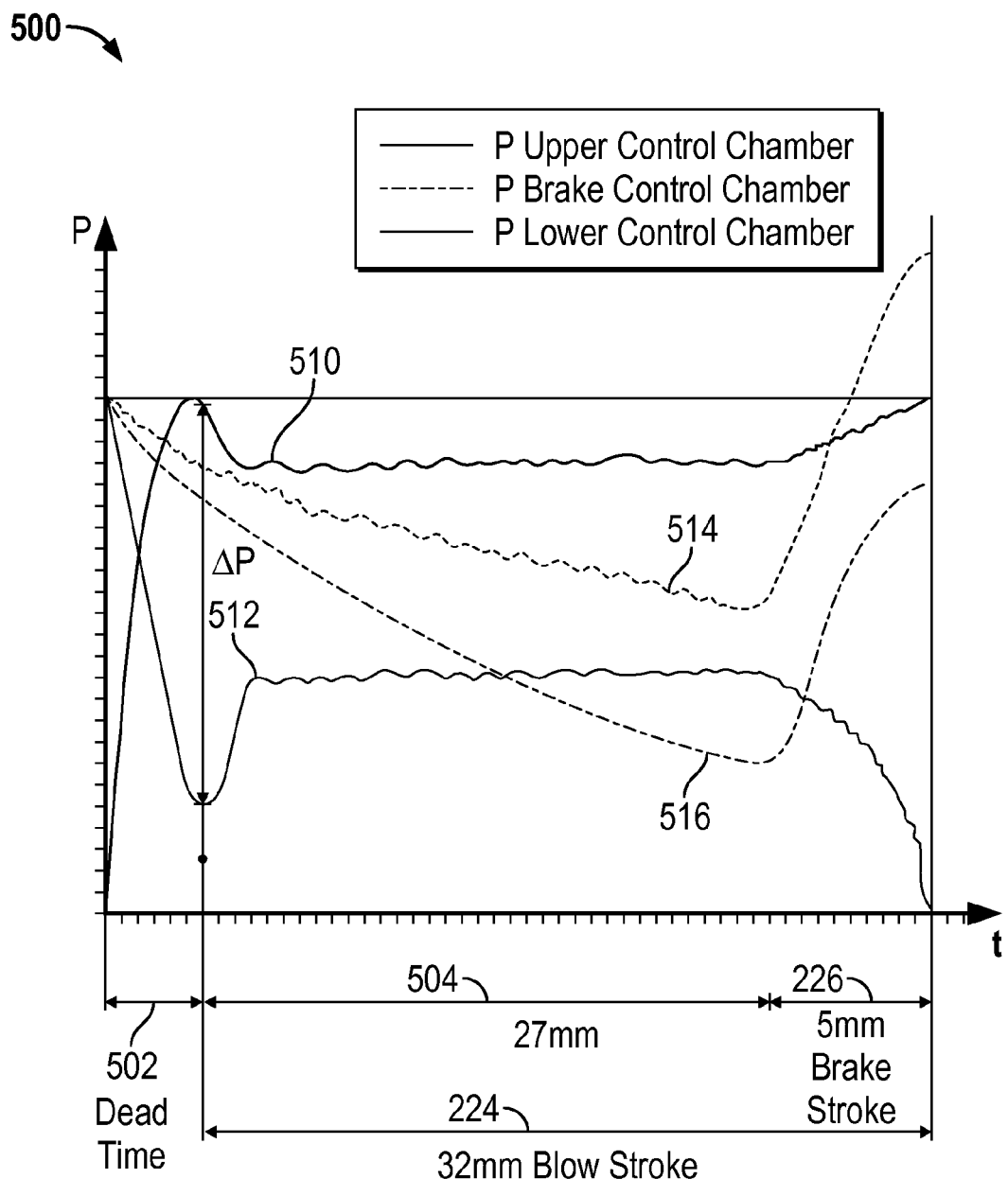
FIG. 5 depicts pressure profile 500, in accordance with an embodiment.

Process 400 continues with phase B. In phase B, blow piston 204 is actuated along the blow stroke towards the extended position, and brake piston 206 is actuated away from the extended position. For example, FIG. 5 depicts a pressure profile 500. Pressure profile 500 is an example implementation of phases B and C of FIG. 4. In pressure profile 500, the X-axis represents time. Labels 504, 226, and 224 under the X-axis further correlate time to the distance that blow piston 204 is displaced in time t. The Y-axis represents pressure. A plot 510 represents the pressure in upper control chamber 216, a plot 512 represents the pressure in lower control chamber 218, and plots 514 and 516 represent example pressure profiles of the brake control chamber 220.

In phase B, pressure is applied to upper control chamber 216 and vented from lower control chamber 218 to actuate blow piston 204. Pressure profile 500 depicts an initial dead time 502 after pressurized fluid is initially applied to upper control chamber 216 and fluid is vented from lower control chamber 218, but before blow cylinder 200 commences to actuate. During dead time 502, plot 510 depicts an initial increase in upper control chamber 216 pressure towards an upper value. During dead time 502, plot 512 also depicts a rapid decrease in the pressure of lower control chamber 218. When the difference between plots 510 and 512 reaches a value represented by ΔP in FIG. 5, blow piston 204 overcomes static friction and begins to actuate along blow stroke 224. Once blow piston 204 begins actuation along blow stroke 224, plots 510 and 512 indicate that the upper and lower control chambers 216 and 218 pressure levels are substantially constant while the blow piston 204 travels across the portion of blow stroke 224 that does not overlap brake stroke 236.

In embodiments, the pressure in brake control chamber 220 at the start of phase B may be exhausted through one-way adjustable throttle valve 256, as fluid is released from brake control chamber 220. By controlling the adjustable throttle valve 256, different rates of pressure release from the brake control chamber 220 may be effected. For example, pressure profile 500 depicts two plots of brake control chamber 220 pressure, plots 514 and 516. The brake control chamber 220 may lose pressure at a steady rate until the end of phase B, when blow piston 204 contacts brake piston 206, as described below.

Advantageously, in phase B blow piston 204 may actuate quickly, with little damping during the portion of blow stroke 234 that does not overlap brake stroke 236.

The longer the proportion of blow stroke 234 that does not overlap brake stroke 236, the faster blow cylinder 200 may operate in an SBM cycle.

Process 400 continues with phase C. In phase C, blow piston 204 comes into contact with the top of brake piston 206 and actuates along the fraction of the blow stroke 234 that overlaps brake stroke 236. For example, in FIG. 5, pressure profile 500 depicts plots 510, 512, 514 and 516 over the length of brake stroke 226. The actuation of blow piston 204 towards the extended position is dampened by brake piston 206 when blow piston 204 makes contact with brake piston 206. Blow piston 204 passes a downward force into brake piston 206, compressing brake control chamber 220. The compression of brake control chamber 220 causes the pressure in brake control chamber 220 to increase, dampening the movement of blow piston 204 towards the extended position. Brake control chamber 220 continues to exhaust fluid as blow piston 204 and brake piston 206 pass through brake stroke 226. Eventually, blow piston 204 and brake piston 206 come to rest at the end of brake control bore 244 inside blow cylinder 200.

In the example of FIG. 5, blow stroke 224 is 32 mm and the brake stroke 226 is 5 mm. This is not intended to be limiting, however. In embodiments, blow stroke 224 and brake stroke 226 may be any respective lengths, and any fractional percentage of one another.

Advantageously, brake piston 206 may be controlled independently of the actuation of the blow piston 204 towards the extended position. Independent brake control chamber 220 may be pressurized or depressurized independently of the actuation of blow piston 204. Adjustable throttle valve 256 may be used to create different levels of damping. The result is that blow cylinder 200 may actuate with a high speed over the majority of blow stroke 234, to brake over a relatively short braking distance 236 without damaging blow molding equipment or preforms.

Process 400 continues with phase D. In phase D, blow cylinder 200 is in the extended position and stretch rod 212 is actuated into the preform. In the extended position, nozzle 210 may be seated on preform 108 and/or blow mold 106. Blow piston ports 214 of blow piston 204 align with cylinder port 208, providing a fluid connection between blow valve block 102 and preform 108. Nozzle 210 or preform 108 may include a seal to be seated between nozzle 210 and preform 108, providing an air tight seal.

In phase D, the SBM process may initiate blowing preform 108 into a final product. Pressurized fluid may be used to expand preform 106 into blow mold 106. Stretch rod 212 may be further used to longitudinally stretch preform 106 towards the bottom of blow mold 106, as shown in phase D of FIG. 4.

Phase D may include a pre-blow phase. Phase D may further include one or more blasts of high-pressure fluid to further define the features of the bottle formed from preform 108.

Figure 6:
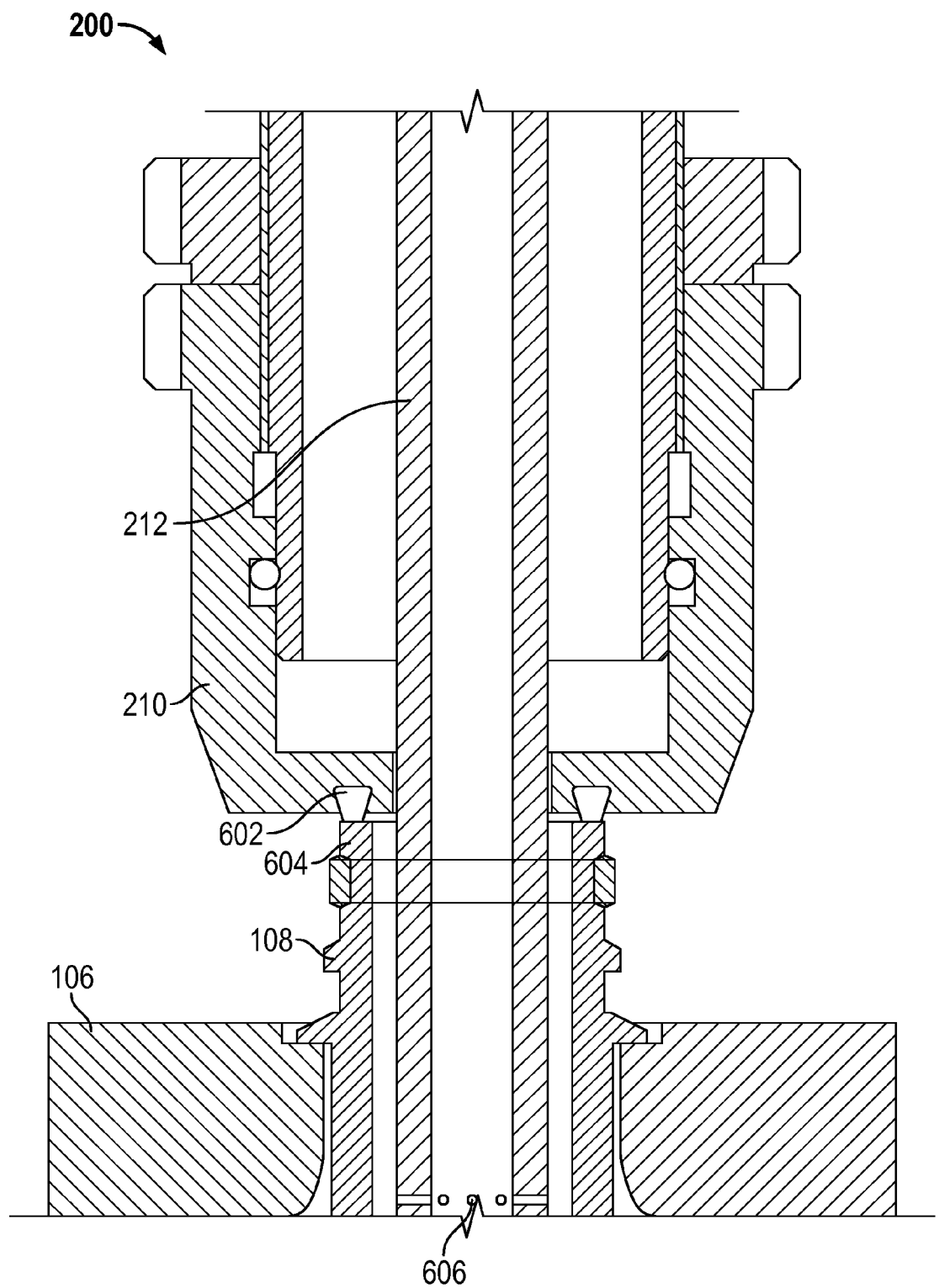
FIG. 6 depicts a detail of blow cylinder 200, in accordance with an embodiment.

In embodiments of phase D, the blowing operation may include a hot fill operation. In the hot fill operation, blow mold 106 is heated. Heat may be hazardous to seals, however. FIG. 6 depicts an embodiment of the invention that may prevent damage to seals during a hot fill operation. FIG. 6 includes an adjustable nozzle 210. Adjustable nozzle 210 may be configured to seat on a top 604 of preform 108, with seal 602 positioned between. In embodiments, seal 602 may be coupled to adjustable nozzle 210 or preform 108. Advantageously, seating nozzle 210 on the top 604 of preform 108 allows seal 602 to avoid heat damage from blow mold 206. In embodiments, after the blowing cycles have completed, cool fluid may pass through a center conduit of stretch rod 212 and emerge from small holes 606 positioned on the end of stretch rod 212 to cool the finished bottle.

Figure 7:
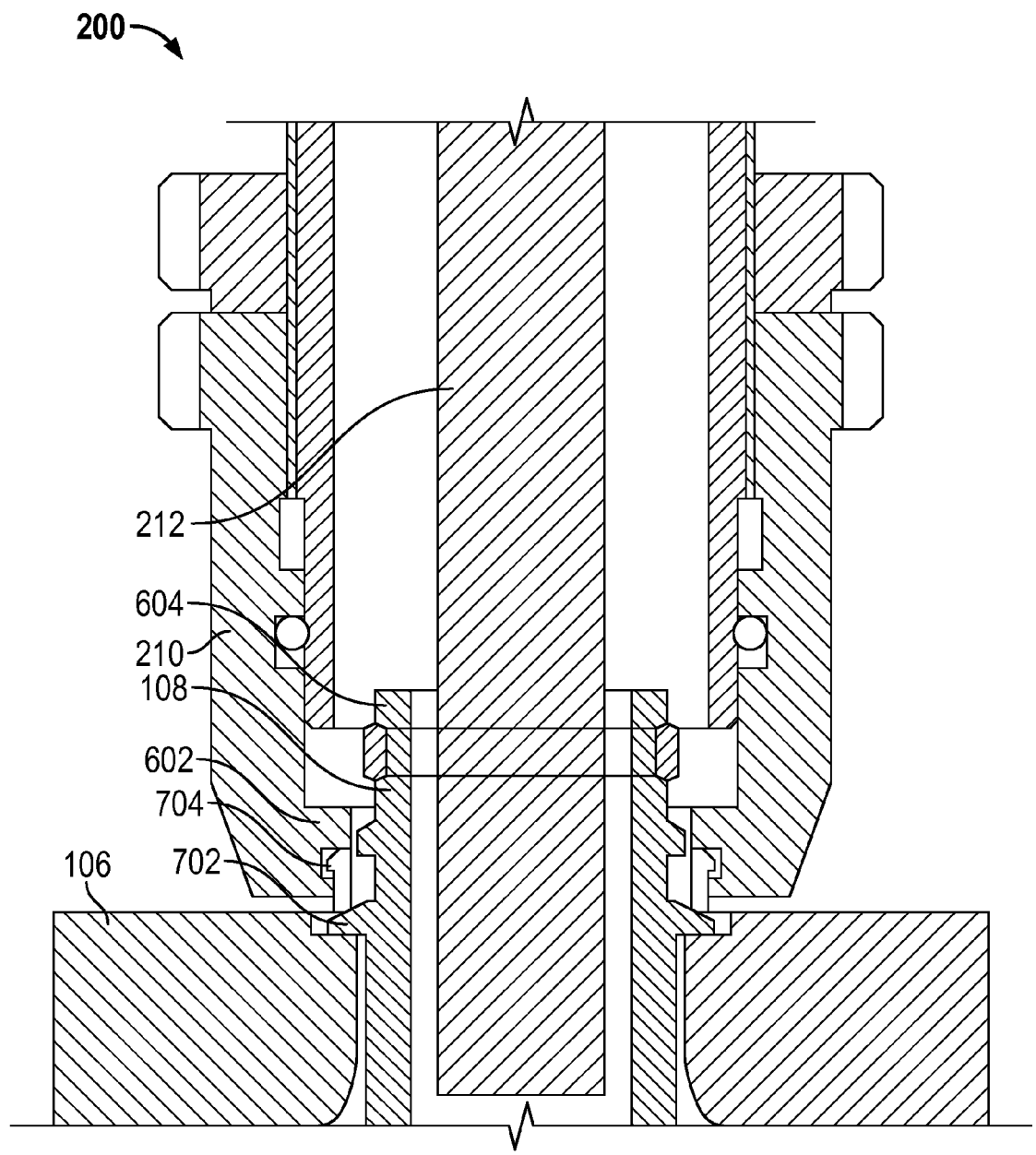
FIG. 7 depicts a detail of blow cylinder 200, in accordance with an embodiment.

Phase D may alternatively include a cold set operation. In the cold set operation preform 108, heated in an oven before the start of process 400, is subsequently cooled rapidly via a fluid-cooled blow mold 106. The risk of heat damage to seals during a cold set operation is minimal. Nozzle 210 may therefore be seated further down on a neck portion of preform 108 that is positioned closer to blow mold 106. For example, FIG. 7 depicts nozzle 210 with a seal 704 designed to seat on a neck portion 702 of preform 108.

In embodiments, adjustable nozzle 210 may be adjusted to seat on neck 702 or top 604 of preform 108. In embodiments, adjusting nozzle 210 may include extending or retracting a length of nozzle 210 along the direction of blow stroke 234 to make contact with different portions of preform 108. In other embodiments, the width of the opening of nozzle 210 may be adjusted to match the width of the part of the preform upon which nozzle 210 may be seated.

Advantageously, adjustable nozzle 210 may allow the same blow cylinder 200 to be used for cold set, hot fill, low, and high pressure operations. This may both reduce the amount of equipment needed to operate the SBM process and shorten the cycle time, requiring simpler logistics and spare parts support.

Process 400 continues with phase E. In phase E the brake piston 220 is actuated away from the extended position so that brake piston 220 is resting against lip 238 inside cylinder body 202. Blow piston 204 is actuated mid-way between the extended and the retracted positions. Stretch rod 212 is retracted inside nozzle 212, and nozzle 212 is unseated from preform 108. In the example of pneumatic circuit 302, valve 254 may return to the first position, wherein upper control chamber 216 and brake control chamber 220 are vented and pressurized fluid is passed into lower control chamber 218. In the example of pneumatic circuit 304, valve 254 may return to the first position to vent upper control chamber 216 and provide pressurized fluid to lower control chamber 218. In pneumatic circuit 304, valve 306 may further return to the first position to provide pressurized fluid to brake control chamber 220. In embodiments, valve 306 may provide pressurized fluid to brake control chamber 220 before valve 254 actuates blow piston 204 away from the extended position. Advantageously, this may accelerate the retraction of blow cylinder 200, providing for a faster SBM cycle time.

Process 400 continues with phase F. In phase F blow cylinder returns to a retracted position, similar to phase A. Preform 108 has been removed from blow mold 106, and the SBM machine is ready to commence a new SBM cycle.

Blow cylinder 200 provides many advantages over the prior art. The blow piston 204 plus independent brake piston 206 provides a simpler design than those of the prior art, requiring fewer moving parts and less moving mass. By providing a shorter brake stroke and less moving mass, blow cylinder 200 may actuate over a larger percentage of the blow stroke more quickly while continuing to come into gentle contact with other parts. The use of an adjustable nozzle simplifies the amount of equipment required, the amount of spare parts required, and operation of the equipment.

I claim:
1. A blow cylinder (200), comprising:
  a blow piston (204); and
  a brake piston (206),
  wherein the brake piston (206) is controlled independently of the actuation of the blow piston (204) towards an extended position.
2. The blow cylinder (200) of claim 1, wherein the blow piston (204) is configured to actuate via an upper control chamber (216) and a lower control chamber (218), and the brake piston (206) is configured to actuate via a brake control chamber (220).
3. The blow cylinder (200) of claim 2, wherein the brake control chamber (220) includes adjustable braking.
4. The blow cylinder (200) of claim 3,
  wherein the adjustable braking is controlled via an adjustable throttle (256).
5. The blow cylinder (200) of claim 2, wherein the brake control chamber (220) is pressurized independently of the upper control chamber (216) and the lower control chamber (218).

6. The blow cylinder (200) of claim 2, further comprising a first valve (254) in fluid communication with the upper control chamber (216) and the lower control chamber (218), the first valve (254) configured to actuate the blow piston (204).

7. The blow cylinder (200) of claim 6, wherein the first valve (254) is further in fluid communication with the brake control chamber (220), the first valve (254) configured to actuate the brake piston (206).

8. The blow cylinder (200) of claim 1, further comprising an adjustable nozzle (210) coupled to the blow cylinder (204).

9. The cylinder (200) of claim 1, further comprising a seal (602, 704) and a nozzle (210), wherein the seal (602, 704) is seated between the nozzle (210) and a top (604) of a preform (108) when the nozzle (210) is in the extended position.

10. The cylinder (200) of claim 1, further comprising a seal (602, 704) and a nozzle (210), wherein the seal (602, 704) is seated between the nozzle (210) and a neck portion (702) of a preform (108) when the nozzle (210) is in the extended position.

11. The cylinder (200) of claim 1, further comprising at least one damping ring (272) positioned on the brake piston (206) to dampen the movement of the brake piston (206) upon impact with the blow piston (204).

12. A method of actuating a blow cylinder to an extended position, comprising the steps of:
    actuating a blow piston towards the extended position; and
    braking the blow piston using a brake piston,
    wherein the brake piston is controlled independently of the actuation of the blow piston towards the extended position.

13. The method of claim 12, wherein the blow piston is configured to actuate via an upper control chamber and a lower control chamber, and the brake piston is configured to actuate via a brake control chamber.

14. The method of claim 12, wherein the brake control chamber includes adjustable braking.

15. The method of claim 14,
    wherein the adjustable braking is controlled via an adjustable throttle.

16. The method of claim 13, wherein the brake control chamber is pressurized independently of the upper control chamber and the lower control chamber.

17. The method of claim 12, further comprising a first valve in fluid communication with the upper control chamber and the lower control chamber, the first valve configured to actuate the blow piston.

18. The method of claim 17, wherein the first valve is further in fluid communication with the brake control chamber, the first valve configured to actuate the brake piston.

19. The method of claim 12, further comprising an adjustable nozzle coupled to the blow cylinder.

20. The method of claim 12, further comprising a seal and a nozzle, wherein the seal is seated between the nozzle and a top of a preform when the nozzle is in the extended position.

21. The method of claim 12, further comprising a seal and a nozzle, wherein the seal is seated between the nozzle and a neck portion of a preform when the nozzle is in the extended position.

22. The method of claim 12, further comprising at least one damping ring positioned on the brake piston to dampen the movement of the brake piston upon impact with the blow piston.

23. The method of claim 12, further comprising the step of:
    actuating the brake piston to initiate actuation of the blow cylinder away from the extended position.

* * * * *